United States Patent [19]

White

[11] Patent Number: 5,035,565
[45] Date of Patent: Jul. 30, 1991

[54] HINGE BAR CONNECTOR ASSEMBLY TO CONNECT RAMPS TO A FLAT BED TRAILER

[76] Inventor: Paul White, 135 Oak Ave., Lockport, Ill.

[21] Appl. No.: 468,293

[22] Filed: Jan. 22, 1990

[51] Int. Cl.⁵ .............................................. B65G 69/28
[52] U.S. Cl. .................................... 414/537; 14/71.1; 14/69.5
[58] Field of Search ............... 414/532, 537, 538, 554, 414/523; 14/69.5, 71.1; 296/61

[56] References Cited

U.S. PATENT DOCUMENTS

| | | | |
|---|---|---|---|
| 2,559,712 | 7/1951 | Dobbs | 414/537 X |
| 3,058,603 | 10/1962 | Tantlinger et al. | 414/537 |
| 3,095,989 | 7/1963 | Morrison | 414/537 |
| 3,147,869 | 9/1964 | Fujioka et al. | 414/537 X |
| 3,307,719 | 3/1967 | Martin, Jr. | 414/537 |
| 3,510,015 | 5/1970 | Roshaven | 296/61 |
| 3,735,440 | 5/1973 | Hetmanski | 14/71.1 |
| 4,043,468 | 8/1977 | Shea | 414/523 |
| 4,721,426 | 1/1988 | Bell et al. | 414/340 |
| 4,874,284 | 10/1989 | New, Jr. | 414/537 |

Primary Examiner—David A. Bucci
Assistant Examiner—Craig Slavin
Attorney, Agent, or Firm—Ernest Kettelson

[57] ABSTRACT

A hinge bar connector assembly to connect spaced apart and separate ramps to a flat bed trailer of the type commonly known as a "hot shot" trailer of a semi-truck and trailer combination. Such trailers have spaced apart sockets or receiving channels around the peripheral edges of the trailer, including along both sides as well as along the front edge and the rear edge. The connector assembly in accordance with this invention has a first connecting member with two spaced apart legs to seat in a pair of adjacent receiving channels or sockets which support a pair of laterally spaced apart hinges and a removable hinge rod on which one end of a ramp having a connectable hinge member is pivotally connected. It also has a second identical connecting member seated in a pair of adjacent receiving channels or sockets which are spaced apart from the first connecting member to which a second ramp having a connectable hinge member is pivotally connected. The ramp members and their respective connecting members are spaced apart whatever distance desired for the items to be rolled up or down on said pair of ramp member for loading or unloading the trailer.

5 Claims, 3 Drawing Sheets

HINGE BAR CONNECTOR ASSEMBLY TO CONNECT RAMPS TO A FLAT BED TRAILER

BACKGROUND OF THE INVENTION

This invention relates to connecting assemblies for connecting ramps to trailers for loading and unloading. In particular it relates to those having already provided sockets at spaced apart intervals around the edges of the trailer, primarily for the purpose of receiving the insert portions of vertically extending stakes or posts of removable side walls.

Trailers of this type are commonly known in the trucking trade as "hot shot" trailers. In addition to spaced apart sockets in which to seat the insert portions of removable side walls, such trailers usually have other items of equipment such as winches, or support bars or brackets, and other obstructing elements secured to the side edge of the trailer between some of the pairs of receiving sockets. Thus, except for the removable side walls, it is difficult and in some cases impossible to seat other items of equipment, such as a ramp assembly, in adjacent pairs of such receiving sockets. The hinge bar connector assembly in accordance with this invention solves such problems by providing a pair of separate connecting assemblies each carrying an elongated removable hinge bar to which separate ramp members can be connected, and seated in respective spaced apart pairs of adjacent sockets along the edge of the trailer. The elongated removable hinge bar of each connector assembly has a lateral dimension greater than the distance the adjacent pair of sockets are spaced apart in which each respective connector assembly is seated. The ramp member pivotally connected to such elongated hinge bar can be moved laterally on such elongated hinge bar to laterally adjust the distance each of the separate ramp members are spaced apart for precise alignment with the spaced apart wheels of a vehicle or other item to be loaded or unloaded on the trailer.

Examples of prior art ramp connectors for loading and unloading of vehicles or other items having wheels include those disclosed in the following United States patents:

U.S. Pat. No. 4,721,426 discloses a bridge plate for moving automobile between railroad cars in which the bridge plate includes an intermediate upright truss and two bracing trusses joined thereto of inverted trapezoidal cross section.

U.S. Pat, No. 4,657,233 discloses a spring loaded permanently connected ramp assembly for ease in pivoting the ramps between their raised and lowered positions.

U.S. Pat. No. 4,043,468 discloses another permanently connected ramp, this one being retractable.

U.S. Pat. No. 307,719 discloses still another permanently connected ramp, this one being a floating ramp which can be moved on top of the trailer when not in position for loading something on to the trailer.

U.S. Pat. No. 3,147,869 discloses a freight handling assembly which includes a ramp and rollers for loading freight items on to a railroad car in which the rollers are retractable after the freight item has been loaded.

U.S. Pat. No. 3,095,989 discloses permanently mounted side ramps on a truck for loading and unloading shipping containers carried on a platform having rollers or wheels.

U.S. Pat. No. 3,058,603 discloses another type of support and carrying frame for freight containers on which ramps are pivotally and permanently mounted.

U.S. Pat. No. 3,021,970 discloses a trailer having upright load retaining stakes which are pivotally and permanently mounted to also serve as ramps when pivoted downwardly to a diagonal ramp position.

U.S. Pat. No 2,559,712 discloses a permanently mounted pivotable bracket having a receiving portion capable of receiving and holding skids of various types for rolling or sliding items of freight on and off of a trailer or wagon.

U.S. Pat. No. 2,355,867 discloses another freight carrying device in which permanently mounted pivotable arms are pivotable from an upright position to a horizontal or diagonal position to serve as a skid or ramp for loading and unloading freight.

SUMMARY OF THE INVENTION

It is an object of the invention to provide a hinge bar connecting assembly to pivotally connect one or more ramps to a flat bed trailer in receiving sockets already provided along its peripheral edge, and for disconnecting said ramps from said hinge bar connecting assemblies.

It is an object of the invention to provide a hinge bar connecting assembly comprising a pair of connecting members to seat in receiving sockets provided along the peripheral edge of a flat bed cargo carrier at spaced apart locations for pivotally connecting a separate ramp member to each one of said pair of connecting members and for disconnecting said ramp members therefrom.

It is an object of the invention to provide a hinge bar connecting assembly to removably connect one or more ramps to a cargo carrier at a plurality of different locations around the peripheral edge of such cargo carrier.

DESCRIPTION OF PREFERRED EMBODIMENT

Figure 1:
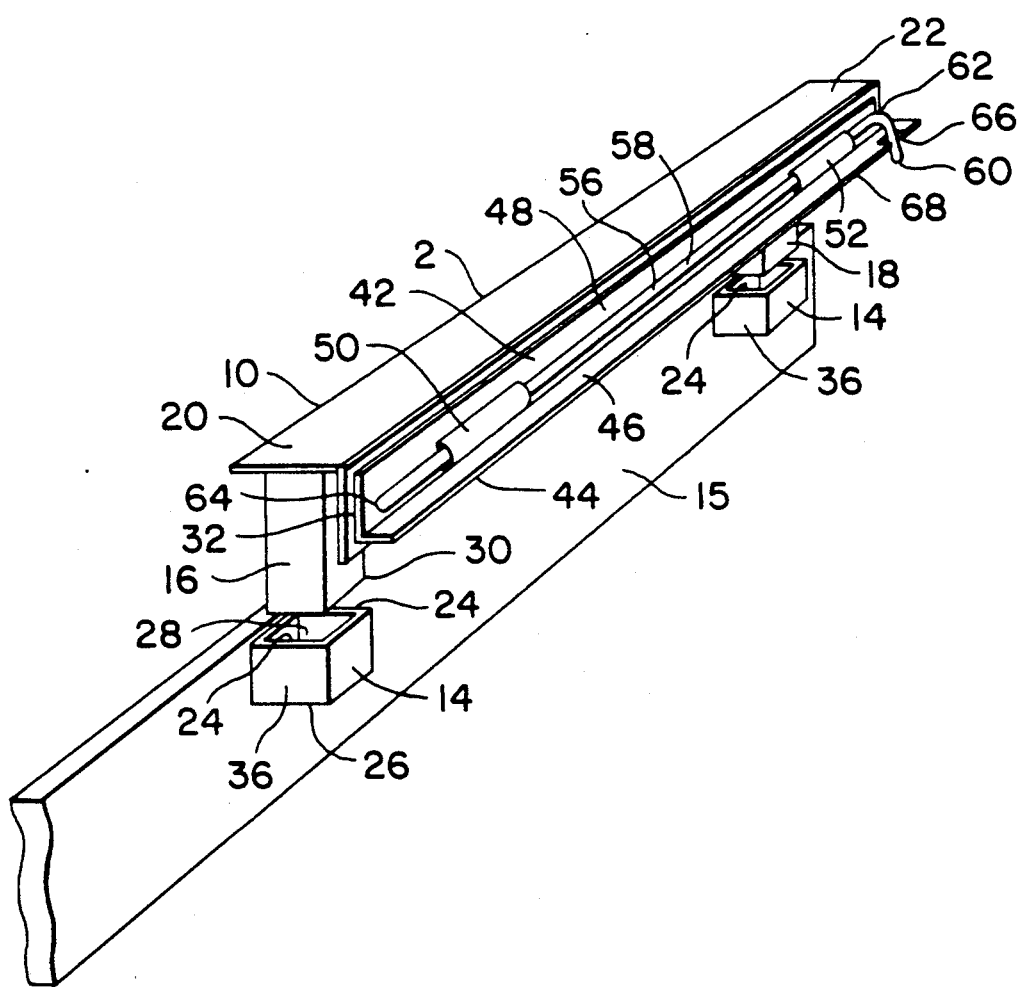
FIG. 1 is a perspective view of one hinge bar connecting member of the connector assembly for ramps in accordance with this invention.
Figure 2:
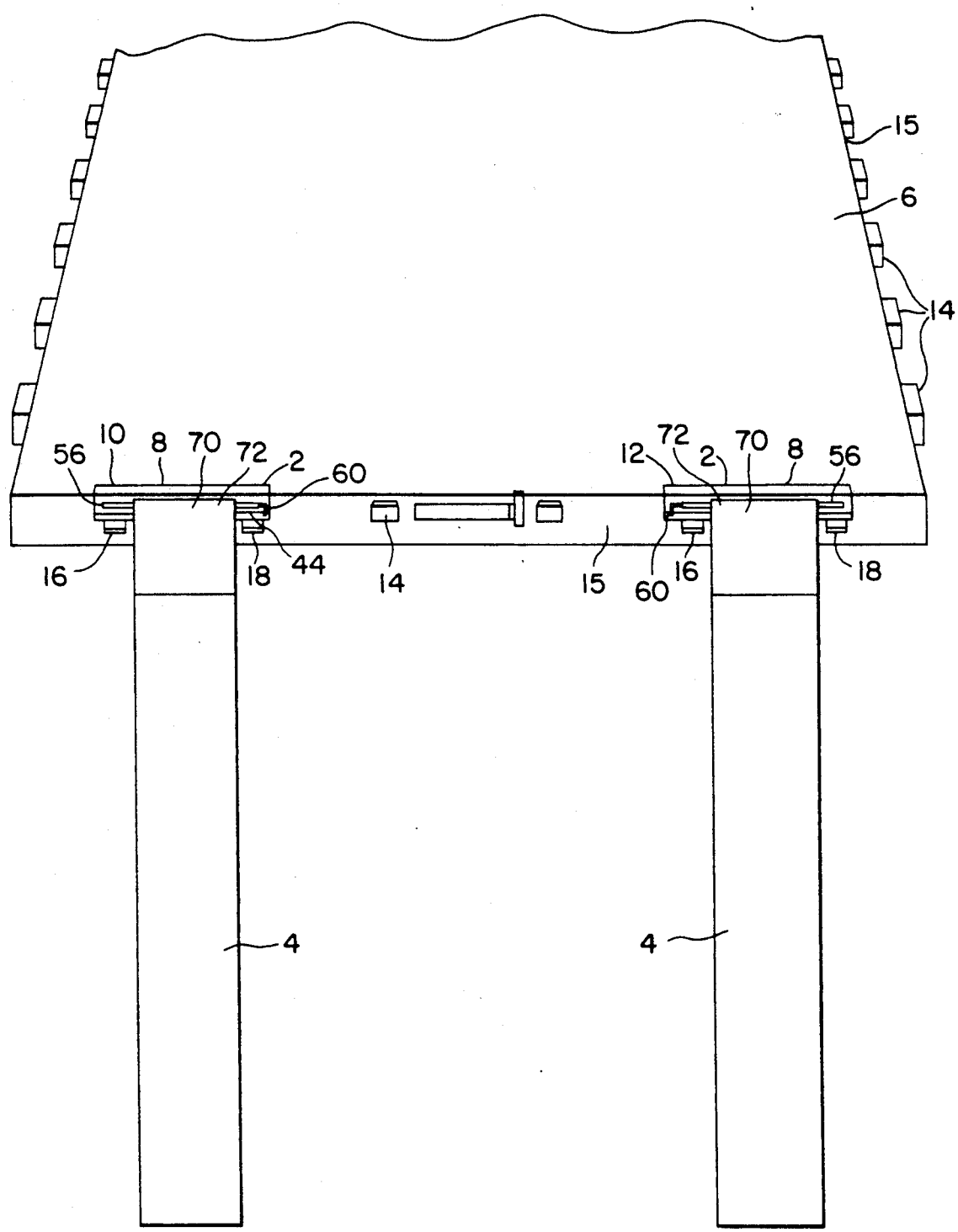
FIG. 2 is a perspective view of the bed of a flat bed trailer having spaced apart sockets around its peripheral edge and a pair of connecting members which comprise the hinge bar connector assembly for ramps in accordance with this invention, seated in respective adjacent pairs of sockets and with a pair of ramps connected thereto.
Figure 3:
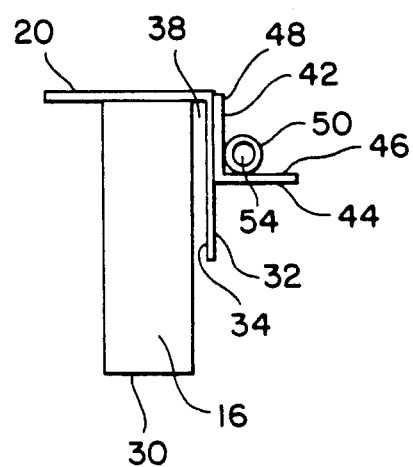
FIG. 3 is a side elevation view of a hinge bar connecting member in accordance with this invention.
Figure 4:
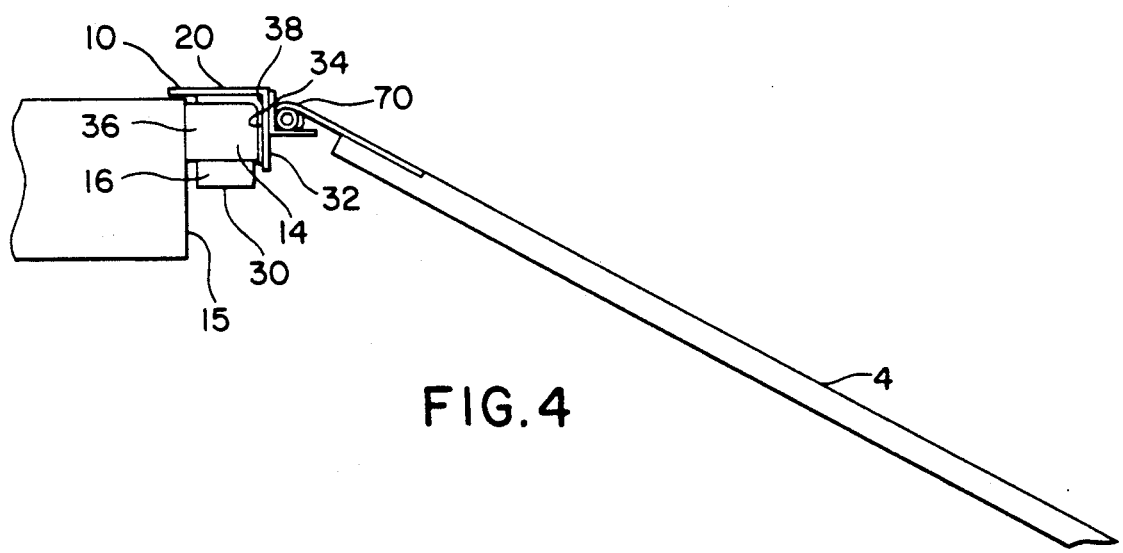
FIG. 4 is a side elevation view of a hinge bar connecting member having a ramp connected thereto.

A hinge bar connector assembly 2 to connect spaced apart and separate ramp members 4 to a flat bed trailer 6 in accordance with this invention comprises a pair of connecting members 8, including a first connecting member 10 and a second connecting member 12, each of which is identical.

The detail description of the parts of the first connecting member 10 as set forth herein would be the same for the second connecting member 12.

The flat bed trailer 6 with which the connector assembly 2 in accordance with this invention is used has plurality of spaced apart receiving channels or sockets 14 located around the peripheral edges 15 of the trailer 6. Such sockets 14 are normally used to receive the insert ends of stakes secured to removable side and end walls which may be installed on the trailer for certain loads in which side and end walls are needed. Such sockets 14 are normally spaced apart a uniform and standardized distance, so side and end walls having insert stakes spaced apart the same distance can be used interchangeably with different trailers.

The connecting member 10 includes a pair of downwardly extending insert members 16 and 18, extending downwardly from horizontally extending and elongated cross-plate 20 of the inserted L-shaped and elongated cross piece support member 22. The insert members 16 and 18 are spaced apart the same distance as the receiving channels or sockets 14 of the trailer 6. Each insert member 16 and 18 have a cross-sectional configuration and dimension corresponding to that of the sockets 14 to be received therein in a snug fit. The insert members 16 and 18 have a length dimension sufficient to extend from the upper edge 24 to the lower edge 26 of the sockets 14 when received into the through channels 28 thereof and the connecting member 10 is fully seated therein. The insert members 16 and 18 may preferably be even longer so the lower free ends 30 of each insert member extends downwardly beyond the lower edge 26 of sockets 14 when the connecting member 10 is fully seated therein.

The inverted L-shaped support member 22 includes an elongated vertically extending cross-plate 32 integrally joined at a right angle to horizontally extending cross-plate 20. The vertically extending cross-plate 32 has an inwardly facing planar surface 34 facing a corresponding portion of each of the spaced apart insert members 16 and 18 and is spaced apart therefrom a distance corresponding to the thickness of the peripheral wall 36 of the sockets 14 thereby providing a receiving slot 38 between the inner surface 34 of vertically extending cross-plate 32 and each of the insert members 16 and 18.

The corresponding facing portions of the peripheral wall 36 of each socket 14 are received in such slots 38 when the connecting member 10 is fully seated therein. At such time, the inwardly and downwardly facing surface 40 of the horizontally extending cross-plate 20 seats against the upper edge 24 of each of the pair of sockets 14 in which the insert members 16 and 18 of connecting member 10 are received.

The vertically extending cross-plate 32 of inverted L-shaped support member 22 has an outwardly facing planar surface to which is welded or otherwise secured the vertically extending cross-arm 42 of a non-inverted L-shaped hinge support member 44. Such non-inverted L-shaped hinge support member has a horizontally extending cross-arm 46 integrally joined to and extending outwardly at a right angle from the lower edge of the vertically extending cross-arm 42.

The outwardly facing side 48 of vertically extending cross-arm 42 has a pair of spaced apart elongated tubular hinge members 50 and 52 welded or otherwise secured thereto, with their respective through channels 54 axially aligned to receive an elongated hinge bar 56 therein.

The hinge bar 56 includes an elongated shank 58 received through the spaced apart axially aligned hinge members 50 and 52, and a short handle 60 at one end 62 of the shank 58 integrally joined thereto and extending at a right angle thereto.

When the hinge bar 56 is fully received and held by the hinge members 50 and 52, its free end 64 extends through and beyond hinge member 50. Its opposite handle end 62 is at such time adjacent the other hinge member 52, with handle 60 in pivotable registration with a retaining notch 66 extending inwardly from the outer free edge 68 of horizontally extending cross-arm 46. Thus, when hinge bar 56 is fully received in hinge members 50 and 52, its handle 60 can be rotated to be received in the notch 66 thereby preventing withdrawal of the hinge bar 56 from the hinge members 50 and 52 until the hinge bar is rotated to lift handle 60 out from the retaining notch 66.

The hinge members 50 and 52 are spaced apart a distance corresponding to the width of the ramp member 4 which is to be connected to the hinge bar 56 between hinge members 50 and 52.

Each ramp member 4 has a hinge member 70 secured to its connecting end 72, having a through channel extending laterally thereof to receive hinge bar 56 therethrough when placed in axially alignment with the through channels of hinge members 50 and 52. Hinge bar 56 is then placed through the axially aligned through channels to secure the ramp 4 to connecting member 10 seated in an adjacent pair of sockets 14 along the side edge of the trailer 6. The handle 60 is then rotated to seat in retaining notch 66 whereupon ramp 4 is secured and locked in place.

The same procedure is followed with regard to connecting member 12. It is seated in an adjacent pair of sockets 14 spaced apart from connecting member 10 whatever distance corresponds to the spaced apart rolling surfaces of an item to be loaded on to, or unloaded from, the trailer 6, such as the spaced apart wheels of a vehicle or lateral dimension of a cylindrical drum, or the like.

A second ramp member 4 is then secured to the connecting member 12 in the same manner as described regarding connecting member 10.

I claim:

1. A ramp coupling assembly to couple a ramp to a short side edge portion of the bed of a cargo vehicle, comprising an elongated cross piece support member shorter than any side edge of said bed of said cargo vehicle detachable therefrom and detachable thereto, insert means extending from said support member laterally thereof and at a substantially right angle thereto to be received in socket means secured to said cargo vehicle, including said socket means secured to said cargo vehicle, ramp connecting means to connect said ramp to said support member, said laterally extending insert means and said ramp connecting means being spaced apart, and a receiving space between said insert means and said ramp connecting means to receive a portion of said socket means therein and to thereby enable said elongated cross piece support member to be more securely held by in turn enabling its insert means to be inserted farther into said socket means as said portion thereof is received into said receiving space between said insert means and said ramp connecting means, wherein said laterally extending insert means includes a first insert leg extending laterally from said support member at substantially a right angle thereto in one direction and terminating at a free end, a second insert leg extending laterally from said support member at substantially a right angle thereto in said one direction and terminating at a free end, said second insert leg being spaced apart from said first insert leg a preselected distance, said socket means including a first socket member having a cavity to receive said first insert leg, a second socket member having a cavity to receive said second insert leg, said second socket member being spaced apart from said first socket member said pre-selected distance, each of said cavities of said first and second socket members opening to a first peripheral edge of respective ones of said socket members bordering the respective entrances thereto, said free ends of said insert legs being insertable far enough for said support member to contact and rest against said first peripheral edge of each of said first and second socket members, wherein said support member comprises a cross piece having an inserted L-shaped cross-sectional configuration, including a first laterally elongated plate and a second laterally elongated plate integrally joined thereto extending at substantially a right angle therefrom, said first laterally elongated plate having an inner surface facing in one direction, said second laterally elongated plate having an inner surface facing in a direction which intersects said one direction and an outer surface facing in the opposite direction, said insert legs extending from said inner surface of said first laterally elongated plate and being spaced apart from said inner surface of said second laterally elongate plate to provide said receiving space between said insert legs and said inner surface of said second laterally elongated plate.

2. A ramp coupling assembly to couple a ramp to a short side edge portion of the bed of a cargo vehicle as set forth in claim 1, wherein said ramp connecting means includes a ramp connecting member positioned outwardly of said outer surface of said second laterally elongated plate and outwardly of said insert legs comprising said insert means.

3. A ramp coupling assembly to couple a ramp to a short side edge portion of the bed of a cargo vehicle as set forth in claim 1, wherein said ramp connecting means includes a ramp connecting assembly positioned outwardly of said outer surface of said second laterally elongated plate and outwardly of said insert legs comprising said insert means.

4. A ramp coupling assembly to couple a ramp to a short side edge portion of the bed of a cargo vehicle as set forth in claim 3, wherein said ramp connecting assembly includes a first ramp connecting member positioned outwardly of said outer surface of said second laterally elongated plate and a second ramp connecting member on said ramp, said second ramp connecting member being connectable to said first ramp connecting member.

5. A ramp coupling assembly to couple a ramp to a short side edge portion of the bed of a cargo vehicle as set forth in claim 3, wherein said ramp connecting assembly includes a pair of spaced apart hinge members to pivotally receive an elongated hinge bar, including said elongated hinge bar, said elongated hinge bar comprising an elongated shank and a handle extending from said shank at substantially a right angle, a handle receiving recess positioned outwardly of said second laterally elongated plate and in registration with said handle to receive said handle therein when said elongated hinge bar is received by said spaced apart hinge members and pivoted to rotate said handle into said receiving recess to thereby hold said hinge bar from lateral movement relative to said spaced apart hinge members, and a hinge member on said ramp to pivotally engage said hinge bar for pivotal movement thereon between said pair of spaced apart hinge members.

* * * * *

UNITED STATES PATENT AND TRADEMARK OFFICE
CERTIFICATE OF CORRECTION

PATENT NO. : 5,035,565

DATED : July 30, 1991

INVENTOR(S) : Paul White

It is certified that error appears in the above-identified patent and that said Letters Patent is hereby corrected as shown below:

Column 1, line 57, delete "307,719" and insert
- -3,307,719- - in its place.

<u>In The Claims</u>

Column 5, claim 1, line 13, delete "inserted" and insert - -inverted- - in its place.

Column 5, claim 1, line 24, delete "elongate" and insert - -elongated- - in its place.

Signed and Sealed this

Twenty-second Day of December, 1992

*Attest:*

DOUGLAS B. COMER

*Attesting Officer*   *Acting Commissioner of Patents and Trademarks*